Oct. 23, 1945.  F. M. RONCI  2,387,300
MEANS FOR MOUNTING WORK IN CASINGS FOR DIPPING AND CENTRIFUGING
Filed Jan. 10, 1944  2 Sheets-Sheet 2

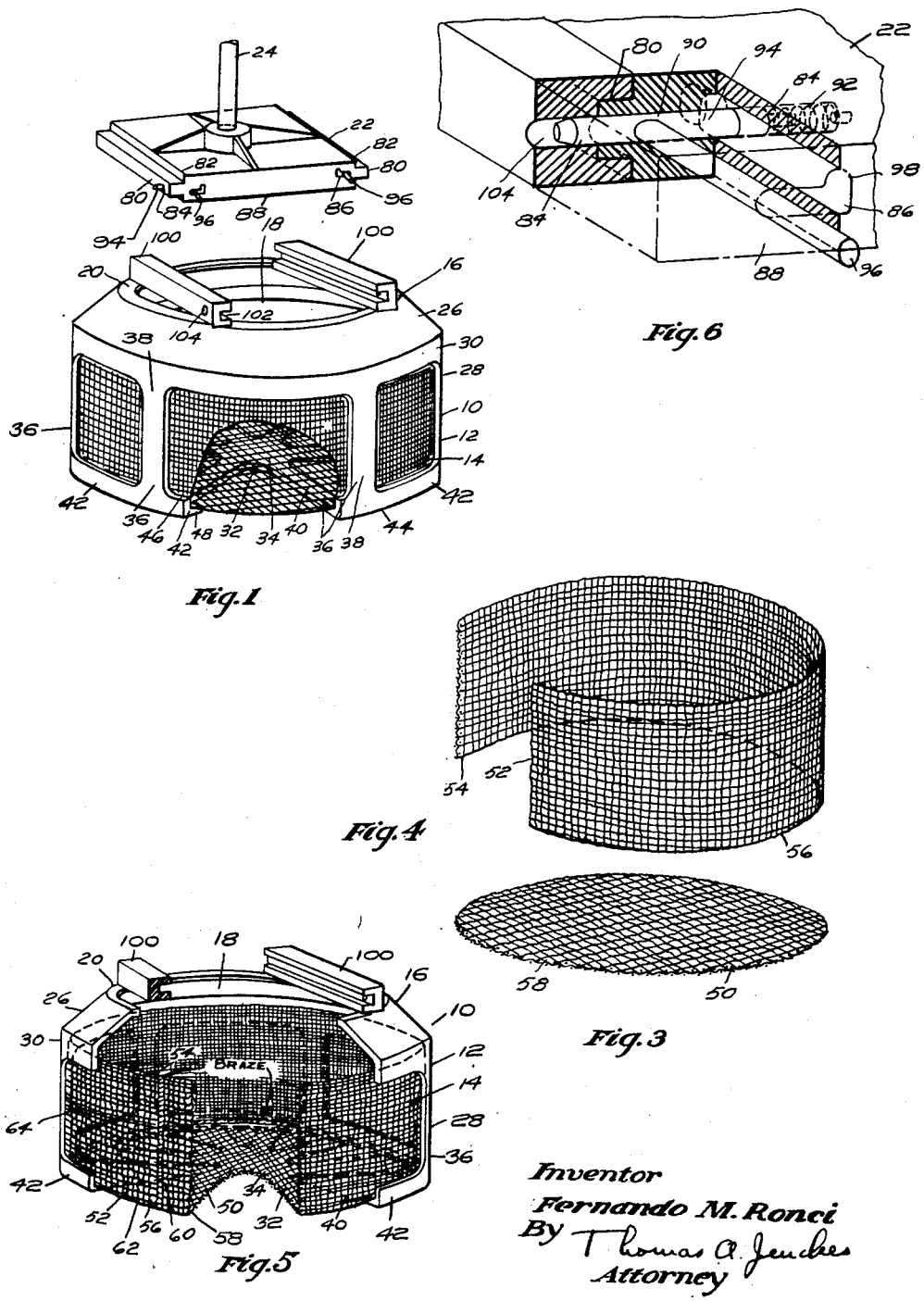

Inventor
Fernando M. Ronci
By Thomas A. Jenckes
Attorney

Patented Oct. 23, 1945

2,387,300

UNITED STATES PATENT OFFICE 2,387,300

MEANS FOR MOUNTING WORK IN CASINGS FOR DIPPING AND CENTRIFUGING

Fernando M. Ronci, Providence, R. I.

Application January 10, 1944, Serial No. 517,736

6 Claims. (Cl. 91—60)

My invention relates to means for mounting work in a casing for dipping and centrifuging and is particularly adapted for use in the type of immersing and drying machine shown in my Patent No. 2,102,819 of December 31, 1937, and in the type of machine shown in my co-pending application for Immersing and centrifuging unit, Ser. No. 517,459, filed January 7, 1944.

My invention is particularly adapted for use in such an immersion machine and includes a basket particularly adapted to hold a multiplicity of small articles, whether they are made of wood, metal, paper, composition, or otherwise for immersion in a suitable immersion liquid, whether it be a cleaning, staining, coating, lacquering, enameling or other immersion liquid, for holding a multiplicity of articles therein while they are being repeatedly immersed and centrifuged in the same machine.

Objects of my invention, therefore, are to provide a light detachable rotatable work holding basket for this purpose comprising a skeleton cage of a novel type and a ready replaceable and removable mesh lining for said cage loosely mounted in the cage to be capable of movement independently of the cage so that it may conform in shape in use for the best centrifuging effect.

A further object of my invention is to provide a basket having a lining which may be readily inserted in a novel manner within the skeleton cage and in one embodiment of my invention a lining which may be readily detached and replaced therefrom.

A further feature of my invention relates to the improved means I preferably employ for detachably securing the basket to the lower end of the rotatable drive shaft therefor and positively locking it thereto in a manner to permit its quick detachment and self-locking.

These and such other objects of my invention as may hereinafter appear will be best understood from a description of the accompanying drawings which illustrate embodiments thereof.

In the drawings,

Fig. 1 is a disassembled perspective view of my improved basket and the attaching plate therefor mounted on the lower end of the drive shaft therefor.

Fig. 3 is a perspective view of the circular lining base.

Fig. 4 is a perspective view of the lining strip adapted to form the side wall of the lining.

Fig. 5 is a perspective view of the basket with portions thereof broken away to show how the parts of the lining are secured together within the cage independently of and without any attachment to the cage.

Fig. 6 is a diagrammatic perspective view of a portion of the attaching means for detachably securing and locking the basket to its supporting plate.

Figure 7:
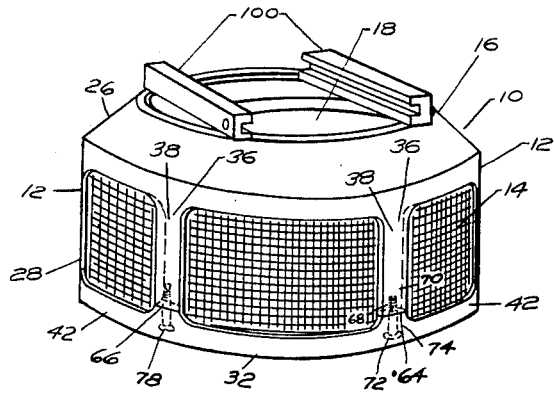
Fig. 7 is a perspective view of a modified form of basket in which the base of the cage is readily removable to permit the substitution of linings therein.
Figure 2:
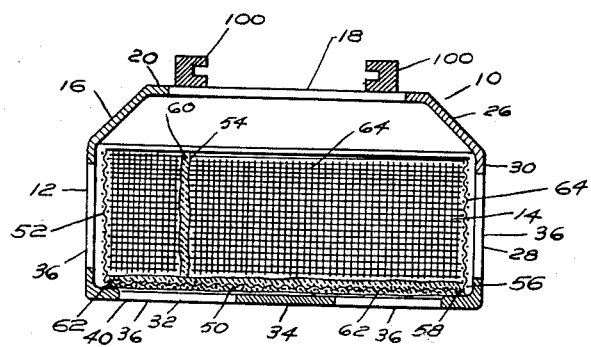
Fig. 2 is a vertical sectional view centrally of the basket.

In the drawings, wherein like characters of reference generally indicate like parts throughout, 10 generally indicates a detachable rotatable work holding basket for dipping and centrifuging work, comprising the cage 12 and lining 14. The cage 12 preferably comprises a cylindrical skeleton cage. The resilient wire mesh lining 14 is preferably loosely mounted within said cage to be capable of movement independently of said cage.

My improved basket is designed to be as light as possible and for this purpose the cage is preferably cast of light metal, such as aluminum, magnesium, etc. I preferably provide a resilient mesh lining, preferably constructed of wire mesh, made out of any suitable metal, such as brass, bronze, etc.

In my preferred embodiment the cylindrical skeleton cage is preferably constructed as follows. It is provided with a top wall 16 having a circular open work-inserting center portion 18 and a solid annular horizontal rim 20 around said open portion 18 for mounting thereon of means to detachably secure it to the supporting plate 22 of the rotatable drive shaft 24 for said basket 10.

I also preferably provide as a portion of said top wall, a solid annular downwardly tilted work retaining outer portion 26 to prevent any tendency of small pieces of work to surge upwardly while being centrifuged. The side wall 28 preferably includes a solid annular upper side wall portion 30. The bottom portion 32 of the cage includes a central flat hub 34. The remainder of the side wall 28 and bottom wall 32 is constructed of the spaced spokes 36 constructed in the following manner. The spaced spokes 36 project downwardly at even circumferentially spaced intervals as at 38 from said narrow side wall portion 30 a sufficient distance to complete the side wall 28 of said cage 12. Said spokes 36 then project radially inwardly as at 40 to said flat central hub 34 completing the skeleton bottom wall 32 of said cage. The portions of said spokes adjacent the line of jointure of said side wall 28 and bottom wall 32 are preferably strengthened by having L-shaped struts 42 joining said spokes 36 together along the line of jointure 44 of said side and bottom walls 28 and 32 having portions even with said spoke portions for this purpose, the vertically extending portions 46 being even with said side wall forming spoke portions 38 and the horizontal portions 48 being even with the bottom wall forming spoke portions 40.

As stated, I preferably employ a resilient wire mesh lining 14 for said cage capable of movement independently of said cage and loosely mounted within said cage. Said lining comprises a circular base 50 shown in Fig. 3 and a strip 52 of wire mesh of a width substantially that of the height of the side wall of the cage and of a length substantially that of the circumference of the cage insertable in strip form within said cage through the work-inserting open portion 18 in the top wall 16 of said cage and arranged in cylindrical formation within said cage as shown in Fig. 5 with the ends 54 thereof substantially abutting and the lower edge 56 thereof adjacent the outer edge 58 of said base 50. I then may readily insert solder through said work opening 18 to provide the line of solder 60 joining the ends 54 of said strip together to form the side wall 64 of said lining and the line of solder 62 circumferentially joining the lower edge 56 of said side wall 64 to the outer edge 58 of said circular base 50. It is thus obvious that I have provided a lining which may be readily inserted into the cage through the opening 18 even though when inserted it is of greater diameter than said opening.

If desired, the base 32 of said cage 12 may be detachably removable from the side wall 28 thereof and I have shown in Fig. 7 a construction suitably modified for this purpose. In this embodiment the lower ends of the side runs 38 of said spokes 36 are horizontally split as at 66. Threaded screw holes 68 are provided extending upwardly in the upper portions 70 of said spokes from said splits and threaded screw holes 72 project upwardly within the lower portions 74 of said side wall spoke portions 38 from the lower adjacent surfaces of the radial spoke portions 40 forming said bottom wall.

The screws 78 insertable through said screw holes 72 and 68 secure the upper and lower portions 70 and 74 of the side runs 38 of said spokes 36 together. To remove the lining 14 therefore in the embodiment shown in Fig. 7 it is obvious that it is merely necessary to unscrew the screws 78 so that the shanks thereof are no longer in the screw holes 68 in said upper portions 70, remove the base 32 of said cage from the upper side wall portions 70 and remove the lining 14 therefrom.

As stated, I have also provided a novel type of means for detachably securing my improved work holding basket 10 to the rotatable drive shaft 24 therefor. Said means includes a horizontal preferably square supporting plate 22 rigidly mounted on the lower end of said vertical drive shaft 24 preferably opposite an opening in the casing. Said plate 22 has a spline 80 projecting centrally from each side wall 82 thereof and a hole 84 projecting inwardly of each spline 80 and said plate 22 a substantial distance as shown in Fig. 6, adjacent the front end of each spline and the plate and a slot 86 of substantial length extends inwardly from said front end 88 to a center portion 90 of said hole 84. Spring means 92, such as the coil spring 92, is mounted in the inner end of each hole 84 and a plunger 94 is mounted in each hole to be normally urged outwardly by said spring means 92. Each plunger 94 is provided with a handle 96 projecting radially outwardly and forwardly therefrom to beyond the front end of said slot 86 to be manipulatable from in front of said plate 22. The horizontal slot 86 may be provided with a vertical locking extension 98, if desired.

The remainder of the attaching means are mounted on the flat horizontal rim 20 of the upper wall 16 of said basket and in the embodiment shown comprises facing U-shaped runways 100 having the channels 102 thereof facing each other for receiving said supporting plate splines 80 therein and having holes 104 near the front ends thereof for receiving the outer ends of said plungers 90 mounted in said supporting plate in the manner just described for positively locking said basket to said plate in the desired position thereon.

To attach, it is obvious it is merely necessary to bring the channels 102 of the runways 100 horizontally opposite said splines 80 and slide said basket back horizontally on said locking plate 22, the plunger handles 96 being moved inwardly of the slots 86 to retract the plungers 90 and if desired temporarily retained in the extensions 98 thereof while said basket is being inserted. It is then obvious that when the basket is inserted so that the runways thereof are moved far enough back on said splines 80 (the plunger handles 96 being freed from the extensions 98 in said slots 86) so that the outer ends 94 of the plungers 90 urged outwardly by said springs 92 come opposite the holes 104 in said guideways 100, said springs 92 will urge the outer ends 94 of the plungers 90 within said holes 104 to automatically positively lock the basket 10 to its supporting plate 22.

To detach, it is apparent that it is merely necessary to urge the handles 96 inwardly to remove the outer ends of the plungers 90 from within said holes 104, raise the handles 96 upwardly, if desired, within the extensions 98 of said slots for locking purposes, and the basket 10 may be readily removed from its supporting plate 22 by merely pulling it forwards therefrom until the guideways 102 are free of the splines 80.

It is thus apparent that I have provided a novel type of detachable rotatable work holding basket for dipping and centrifuging work, comprising a skeleton cage and a wire mesh lining therefor loosely mounted in said cage and capable of movement independently of said cage and one in which the lining may be readily inserted through a smaller work-inserting and removal opening 18 in the top of said cage and assembled to position in said cage and in one embodiment thereof in which the lining may be readily removed from said cage and a novel type of means for detachably securing said basket to the rotatable drive shaft therefor, with the advantages explained above.

It is understood that my invention is not limited to the specific embodiments shown and that various deviations may be made therefrom without departing from the spirit and scope of the appended claims.

What I claim is:

1. A detachable rotatable work holding basket for dipping and centrifuging work, comprising a cylindrical light metal skeleton cage having a top wall having a circular, open, work inserting center portion, a solid annular rim around said open portion having a solid annular downwardly tilted work retaining border portion, a solid annular side wall upper portion, a bottom portion having a central flat hub, and spaced spokes projecting downwardly at even circumferentially spaced intervals from said upper annular side wall portion a sufficient distance to complete the skeleton side wall of said cage and then inwardly to said central hub completing the skeleton bottom wall of said cage, and L-shaped struts having portions even with said bent spoke portions joining said spokes together along the line of jointure of said side and bottom walls, and a resilient wire mesh lining for said cage capable of movement independently of said cage loosely mounted within said cage, comprising a circular base resting on said skeleton cage bottom, and a strip of a width substantially that of the height of the side wall of the cage and of a length substantially that of the circumference of the cage inserted within said cage through said work inserting open portion and arranged in cylindrical formation adjacent the side wall of said skeleton frame with the ends thereof substantially abutting, and solder joining the ends of said lining side walls together and the lower edge thereof to the outer edge of said circular base, the lower ends of the side runs of said spokes being broken and detachably securable together to permit removal of used lining from said cage.

2. A detachable rotatable work holding basket for dipping and centrifuging work, comprising a cylindrical light metal skeleton cage having a top wall having a circular, open, work inserting center portion, a solid annular rim around said open portion having a solid annular downwardly tilted work retaining border portion, a solid annular side wall upper portion, a bottom portion having a central flat hub, and spaced spokes projecting downwardly at even circumferentially spaced intervals from said upper annular side wall portion a sufficient distance to complete the skeleton side wall of said cage and then inwardly to said central hub completing the skeleton bottom wall of said cage, and L-shaped struts having portions even with said bent spoke portions joining said spokes together along the line of jointure of said side and bottom walls, and a resilient wire mesh lining for said cage capable of movement independently of said cage loosely mounted within said cage, comprising a circular base resting on said skeleton cage bottom, and a strip of a width substantially that of the height of the side wall of the cage and of a length substantially that of the circumference of the cage inserted within said cage through said work inserting open portion and arranged in cylindrical formation adjacent the side wall of said skeleton frame with the ends thereof substantially abutting, and solder joining the ends of said lining side walls together and the lower edge thereof to the outer edge of said circular base.

3. A detachable rotatable work holding basket for dipping and centrifuging work, comprising a cylindrical skeleton cage having a top wall having a circular, open, work inserting center portion, a solid annular rim around said open portion having a solid annular downwardly tilted work retaining border portion, a solid annular side wall upper portion, a bottom portion having a central flat hub, and spaced spokes projecting downwardly at even circumferentially spaced intervals from said upper annular side wall portion a sufficient distance to complete the skeleton side wall of said cage and then inwardly to said central hub completing the skeleton bottom wall of said cage, and a resilient wire mesh lining for said cage capable of movement independently of said cage loosely mounted within said cage, comprising a circular base resting on said skeleton cage bottom, and a strip of a width substantially that of the height of the side wall of the cage and of a length substantially that of the circumference of the cage inserted within said cage through said work inserting open portion and arranged in cylindrical formation adjacent the side wall of said skeleton frame with the ends thereof substantially abutting, and solder joining the ends of said lining side walls together and the lower edge thereof to the outer edge of said circular base, the lower ends of the side runs of said spokes being broken and detachably securable together to permit removal of used lining from said cage.

4. A detachable rotatable work holding basket for dipping and centrifuging work, comprising a cylindrical skeleton cage having a top wall having a circular, open, work inserting center portion, a solid annular rim around said open portion having a solid annular downwardly tilted work retaining border portion, a solid annular side wall upper portion, a bottom portion having a central flat hub, and spaced spokes projecting downwardly at even circumferentially spaced intervals from said upper annular side wall portion a sufficient distance to complete the skeleton side wall of said cage and then inwardly to said central hub completing the skeleton bottom wall of said cage, and a resilient wire mesh lining for said cage capable of movement independently of said cage loosely mounted within said cage, comprising a circular base resting on said skeleton cage bottom, and a strip of a width substantially that of the height of the side wall of the cage and of a length substantially that of the circumference of the cage inserted within said cage through said work inserting open portion and arranged in cylindrical formation adjacent the side wall of said skeleton frame with the ends thereof substantially abutting, and solder joining the ends of said lining side walls together and the lower edge thereof to the outer edge of said circular base.

5. A detachable rotatable work holding basket for dipping and centrifuging work, comprising a cylindrical light metal skeleton cage having a top having a hole therein, side walls and a base and a replaceable resilient wire mesh lining of greater width than said hole, covering the side walls and base of said cage capable of movement independently of said cage loosely contained within said cage.

6. A detachable rotatable work holding basket for dipping and centrifuging work, comprising a cylindrical light metal skeleton cage having a top having a hole therein, side walls and a detachable base and a replaceable resilient wire mesh lining of greater width than said hole, covering the side walls and detachable base of said cage capable of movement independently of said cage loosely contained within said cage.

FERNANDO M. RONCI.